(12) United States Patent
Hakoi et al.

(10) Patent No.: US 8,064,019 B2
(45) Date of Patent: Nov. 22, 2011

(54) PRODUCTION METHOD OF LIQUID CRYSTAL DISPLAY INCLUDING SCANNING EXPOSURE

(75) Inventors: Hiroyuki Hakoi, Nara (JP); Iichiro Inoue, Tenri (JP); Koichi Miyachi, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/078,267

(22) Filed: Apr. 1, 2011

(65) Prior Publication Data

US 2011/0181823 A1    Jul. 28, 2011

Related U.S. Application Data

(63) Continuation of application No. 12/084,377, filed as application No. PCT/JP2006/323045 on Nov. 13, 2006.

(30) Foreign Application Priority Data

Dec. 2, 2005  (JP) ................................. 2005-350020

(51) Int. Cl.
   *G02F 1/1337*   (2006.01)
(52) U.S. Cl. ......... 349/123; 349/124; 349/129; 349/187
(58) Field of Classification Search .................. 349/126, 349/129, 123–124, 187
   See application file for complete search history.

(56) References Cited

U.S. PATENT DOCUMENTS

| | | | |
|---|---|---|---|
| 5,604,615 A | 2/1997 | Iwagoe et al. | |
| 5,889,571 A | 3/1999 | Kim et al. | |
| 6,335,775 B1 | 1/2002 | Iwamura et al. | |
| 6,512,564 B1 | 1/2003 | Yoshida et al. | |
| 6,583,835 B1 | 6/2003 | Yoshida et al. | |
| 2002/0135725 A1 | 9/2002 | Terashita et al. | |
| 2004/0201806 A1 | 10/2004 | Choo et al. | |

(Continued)

FOREIGN PATENT DOCUMENTS

CN        1450394 A    10/2003

(Continued)

OTHER PUBLICATIONS

International Search Report for PCT/JP2006/323045 mailed Mar. 20, 2007.

(Continued)

*Primary Examiner* — Nathanael R Briggs
(74) *Attorney, Agent, or Firm* — Nixon & Vanderhye P.C.

(57) ABSTRACT

To provide: a production method of a liquid crystal display device, the production method being capable of efficiently and stably providing alignment treatment for an alignment film of the liquid crystal display device, in which a plurality of domains is formed in a pixel region; and an exposure device for alignment treatment. A production method of a liquid crystal display device comprising: a first substrate; a second substrate facing to the first substrate; a liquid crystal layer provided between the substrates; a first alignment film provided on the liquid crystal layer side surface of the first substrate; and a second alignment film provided on the liquid crystal layer side surface of the second substrate, wherein the production method comprises subjecting the first alignment film and/or the second alignment film to scanning exposure continuously over a plurality of pixel regions, and the scanning exposure comprises exposing the first alignment film and/or the second alignment film while scanning an inside of each pixel region more than one time in antiparallel directions to form, in the each pixel region, regions for aligning liquid crystal molecules to the surface(s) of the first alignment film and/or the second alignment film in antiparallel directions.

17 Claims, 4 Drawing Sheets

U.S. PATENT DOCUMENTS

| | | | |
|---|---|---|---|
| 2005/0140886 A1* | 6/2005 | Kim et al. | 349/129 |
| 2005/0259203 A1* | 11/2005 | Kimura et al. | 349/124 |
| 2008/0123046 A1 | 5/2008 | Kimura et al. | |

FOREIGN PATENT DOCUMENTS

| | | |
|---|---|---|
| EP | 0 766 117 | 4/1997 |
| EP | 0 793 133 | 9/1997 |
| GB | 2 309 794 | 8/1997 |
| JP | 07-318942 | 12/1995 |
| JP | 9-152612 | 6/1997 |
| JP | 9-211465 | 8/1997 |
| JP | 10-123576 | 5/1998 |
| JP | 11-133429 | 5/1999 |
| JP | 11-316379 | 11/1999 |
| JP | 11-352486 | 12/1999 |
| JP | 2001-108994 A | 4/2001 |
| JP | 2001-281669 | 10/2001 |
| JP | 2002-277877 | 9/2002 |
| JP | 2004-318151 | 11/2004 |
| TW | 479266 | 3/2002 |

OTHER PUBLICATIONS

U.S. Office Action mailed Mar. 17, 2010 in U.S. Appl. No. 12/084,377.

U.S. Final Office Action mailed Dec. 10, 2010 in U.S. Appl. No. 12/084,377.

U.S. Advisory Action of U.S. Appl. No. 12/084,377 mailed Jun. 30, 2011; Hakoi et al.

U.S. Office Action of U.S. Appl. No. 12/084,377 mailed Apr. 5, 2011; Hakoi et al.

U.S. Advisory Action of U.S. Appl. No. 12/084,377 mailed Jul. 25, 2011; Hakoi et al.

* cited by examiner (a)

(b)

PRODUCTION METHOD OF LIQUID CRYSTAL DISPLAY INCLUDING SCANNING EXPOSURE

This application is a continuation of U.S. patent application Ser. No. 12/084,377 filed Apr. 30, 2008, which is the U.S. national phase of International Application No. PCT/JP2006/323045 filed 13 Nov. 2006 which designated the U.S. and claims priority to Japanese Patent Application No. 2005-350020 filed 2 Dec. 2005, the entire contents of each of which are hereby incorporated by reference.

TECHNICAL FIELD

The present invention relates to a production method of a liquid crystal display device and an exposure device for alignment treatment. More specifically, the present invention relates to a production method of a matrix-type liquid crystal display device which can provide high display quality by forming a plurality of domains in one pixel region. The present invention also relates to an exposure device for alignment treatment.

BACKGROUND ART

Liquid crystal display devices in TN (Twist Nematic) mode have well-balanced characteristics needed for display devices. For example, the devices have a low driving voltage and a relatively fast response speed, and are suitably used for color display because the devices provide monochrome display in principle. Therefore, such liquid crystal display devices in TN mode have been widely used for matrix-type liquid crystal display devices such as an active matrix-type liquid crystal display device and a simple matrix-type liquid crystal display device. However, such devices in TN mode also have disadvantages, such as a narrow viewing angle and a low contrast ratio.

Liquid crystal display devices in VA (Vertical Alignment) mode, which has a high contrast ratio, have been recently developed. In VA mode, liquid crystal molecules align substantially vertically to substrates when no voltage is applied between the substrates, and on the other hand, the liquid crystal molecules align substantially parallel to the substrates when a voltage sufficiently greater than the threshold voltage is applied between the substrates. Domain division techniques of dividing alignment directions of liquid crystal molecules in one pixel region have been developed. These techniques enable one pixel region to have a plurality of regions where the alignment directions of the liquid crystal molecules are different (hereinafter, also referred to as "domain"). As a result, the liquid crystal display devices can provide a wider viewing angle.

In addition, the following liquid crystal display devices in VA mode in which domain division is provided have been practically used. Liquid crystal display devices in MVA (Multi-Domain Vertical Alignment) mode in which, as an alignment control structure, one substrate is provided with electrode slits and the other substrate is provided with projective structures to perform the domain division; and liquid crystal display devices in PVA (Patterned Vertical Alignment) mode in which, as an alignment control structure, both substrates are provided with electrode slits to perform the domain division. These modes can provide liquid crystal display devices having a high contrast ratio, which is an advantage in VA mode, and a wide viewing angle, which is an advantage in the domain division.

However, the liquid crystal display devices in MVA and PVA modes have room for improvement in slow response speed. That is, only liquid crystal molecules near the electrode slits and the projective structures fast start to respond, even if a high voltage is applied to change black state to white state, and liquid crystal molecules, which are far from the alignment control structures, respond late.

For improvement in this response speed, it is effective that alignment treatment is provided for alignment films formed on the liquid crystal layer side surfaces of substrates, whereby to provide liquid crystal molecules with a pretilt angle previously. Also in VA mode, the liquid crystal molecules are previously made slightly incline toward the vertical alignment films, and thereby the liquid crystal molecules can easily incline when a voltage is applied to the liquid crystal layer. As a result, the response speed can be faster. As a method of the alignment treatment for providing the liquid crystal molecules with the pretilt angle, rubbing method, SiOx oblique deposition method, and photo-alignment method may be mentioned, for example.

The domain division is performed to obtain a wide viewing angle in MVA mode and PVA mode. However, there is room for improvement in that the number of the alignment treatment process for the alignment films increases if the domain division is performed. In the photo-alignment method, a domain division method of performing exposure through a photomask more than one time has been proposed, for example. It is preferable in terms of simplification of the production processes that the alignment treatment is performed with a small number of times. However, one pixel region has preferably two or more domains, and most preferably four or more domains in order to secure a wide viewing angle. Therefore, a method which can secure many domains with a small number of alignment treatments has been desired.

As the VA mode in which domain division is provided, a VA mode using vertical alignment films in which alignment directions on each other's substrates are antiparallel in any domain, as shown in FIGS. 8(a) and 8(b), (hereinafter, also referred to as VAECB (Vertical Alignment Electrically Controlled Birefringence) mode) has been proposed. In VAECB mode, as shown in FIG. 8(a), the direction of the absorption axis of first polarizer 35 formed on the first substrate side and the direction of the absorption axis of second polarizer 36 formed on the second substrate side are out of alignment with the alignment direction 31a of the first alignment film 31 and the alignment direction 32b of the second alignment film 32 by 45 degrees. In a mode of dividing one pixel region into four domains, which is particularly excellent in viewing angle (hereinafter, also referred to as 4VAECB mode) in VAECB mode, throughput in volume production decreases since the alignment treatment is performed in four directions, i.e. 45, 135, 225, and 315 degrees when the horizontal direction (azimuthal angle) on the display surface is defined as 0 degree, as shown in FIG. 8(b). For example, Japanese Kokai Publication No. 2001-281669 discloses a technique of performing alignment treatment by a photo-alignment method and thereby providing the VAECB mode. However, in this case, the exposure is performed for the alignment films a total of eight times.

In contrast, VAHAN (Vertical Alignment Hybrid-aligned Nematic) mode, in which one substrate is provided with a vertical alignment film subjected to no alignment treatment, can decrease the number of the alignment treatment. However, there is room for improvement in the response speed since the pretilt angle of the liquid crystal molecules remains 90 degrees on the other substrate side.

With this problem, a VA mode using vertical alignment films in which alignment treatment directions on each other's substrates are perpendicular to cause liquid crystal molecules to form a twist structure (hereinafter, also referred to as VATN (Vertical Alignment Twisted Nematic) mode) has been proposed (for example, with reference to Japanese Kokai Publication No. Hei-11-352486, Japanese Kokai Publication No. 2002-277877, Japanese Kokai Publication No. Hei-11-133429, and Japanese Kokai Publication No. Hei-10-123576). In a liquid crystal display device in VATN mode, as shown in FIG. 5(a), the first alignment film 31 and the second alignment film 32 align the liquid crystal molecules 33 with negative dielectric anisotropy substantially vertically to the alignment film surfaces, and align the liquid crystal molecules 33 near the first alignment film 31 and the liquid crystal molecules 33 near the second alignment film 32 such that the alignment directions of them are perpendicular to each other, when no voltage is applied between the substrates interposing the liquid crystal layer (at OFF-state). Each of the liquid crystal molecules 33 near the surfaces of the first alignment film 31 and the second alignment film 32 has the pretilt angle 34 to the alignment films. As shown in FIG. 5(b), the liquid crystal molecules 33 align in the direction parallel to the substrate surfaces as a voltage is applied between the substrates interposing the liquid crystal layer, depending on the applied voltage, and show birefringence to light transmitted through the liquid crystal layer. In VATN mode, as shown in FIG. 6(a), the direction of the absorption axis of first polarizer 35 and the alignment direction 31a of the first alignment film 31 are the same, and the direction of the absorption axis of second polarizer 36 and the alignment direction 32b of the second alignment film 32 are the same. Alternatively, as shown in FIG. 6(b), the direction of the absorption axis of first polarizer 35 and the alignment direction 32b of the second alignment film 32 may be the same, and the direction of the absorption axis of second polarizer 36 and the alignment direction 31a of the first alignment film 31 may be the same. As shown in FIG. 7, a mode of dividing one pixel region into four domains in VATN mode (hereinafter, also referred to 4VATN mode) needs only four times of the alignment treatment, which is half the number of times in 4VAECB mode. Such VATN mode is theoretically dramatically excellent in that a wide viewing angle and a fast response speed can be provided with a small number of processes. However, a technique of producing the liquid crystal display device in VATN mode has not been established yet. Additionally, the liquid crystal display device in VATN mode is difficult to produce stably because variation in the pretilt angle has a large influence on the transmittance as compared with the liquid crystal display device in VAECB mode.

In a production process of a liquid crystal display panel, a panel substrate to be used becomes larger year by year in order to improve production efficiency and the like. With the enlargement of the substrate size, a large photomask has been needed in the photo-alignment method which performs the exposure through a photomask. However, use of the large photomask has room for improvement in that distortion and the like is generated in the photomask and thereby accuracy of the exposure is reduced. A photomask having high-definition openings is extremely expensive, and therefore, there is room for improvement in that use of the large photomask increases manufacturing costs. With this problem, a method of moving a light source or a substrate (hereinafter, also referred to as "scanning exposure") has been proposed as an exposure method (for example, with reference to Japanese Kokai Publication No. Hei-09-211465, and Japanese Kokai Publication No. Hei-11-316379).

However, there is still room for improvement in that domains having small variation in the characteristics are formed with a small number of alignment treatments if domain division is performed by a photo-alignment method.

SUMMARY OF THE INVENTION

In order to overcome the problems described above, the present invention provides a production method of a liquid crystal display device, the production method being capable of efficiently and stably providing alignment treatment for an alignment film of the liquid crystal display device, in which a plurality of domains is formed in a pixel region.

The present inventors have made various investigations about a production method of a liquid crystal display device, the production method being capable of efficiently and stably providing alignment treatment for an alignment film of the liquid crystal display device, in which a plurality of domains is formed in a pixel region. The inventors noted an exposure method in a photo-alignment method. The inventors found that the alignment film is subjected to scanning exposure continuously over a plurality of pixel regions, which allows for more stable alignment treatment than that in simultaneous exposure in which a light source and a region to be exposed are fixed to expose the inside of the region to be exposed at one time. If a plurality of domains is formed inside a pixel region, the alignment film generally has a complicated alignment pattern in the substrate plane. Therefore, in the scanning exposure, the number of times of the alignment treatment dramatically increases or the alignment treatment itself is difficult. However, the inventors found that in VATN mode and the like, the alignment pattern continues in the substrate plane, and therefore, each pixel region is exposed while scanning the each pixel region more than one time in antiparallel directions to perform the alignment treatment stably with a small number of alignment treatments. As a result, the above-mentioned problems have been solved, leading to completion of the present invention.

That is, the present invention provides a production method of a liquid crystal display device comprising:
  a first substrate;
  a second substrate facing to the first substrate;
  a liquid crystal layer provided between the substrates;
  a first alignment film provided on the liquid crystal layer side surface of the first substrate; and
  a second alignment film provided on the liquid crystal layer side surface of the second substrate,
  wherein the production method comprises subjecting the first alignment film and/or the second alignment film to scanning exposure continuously over a plurality of pixel regions, and
  the scanning exposure comprises exposing the first alignment film and/or the second alignment film while scanning an inside of each pixel region more than one time in antiparallel directions to form, in the each pixel region, regions for aligning liquid crystal molecules to the surface(s) of the first alignment film and/or the second alignment film in antiparallel directions.

BRIEF DESCRIPTION OF THE DRAWINGS

FIG. 5(a) shows OFF-state, and FIG. 5(b) shows ON-state.

Each of FIGS. 6(a) and 6(b) is a conceptual view showing positional relationships of alignment directions of alignment films and directions of absorption axes of polarizers in one domain of a liquid crystal display device in VATN mode.

BRIEF DESCRIPTION OF THE DRAWINGS

Figure 1:
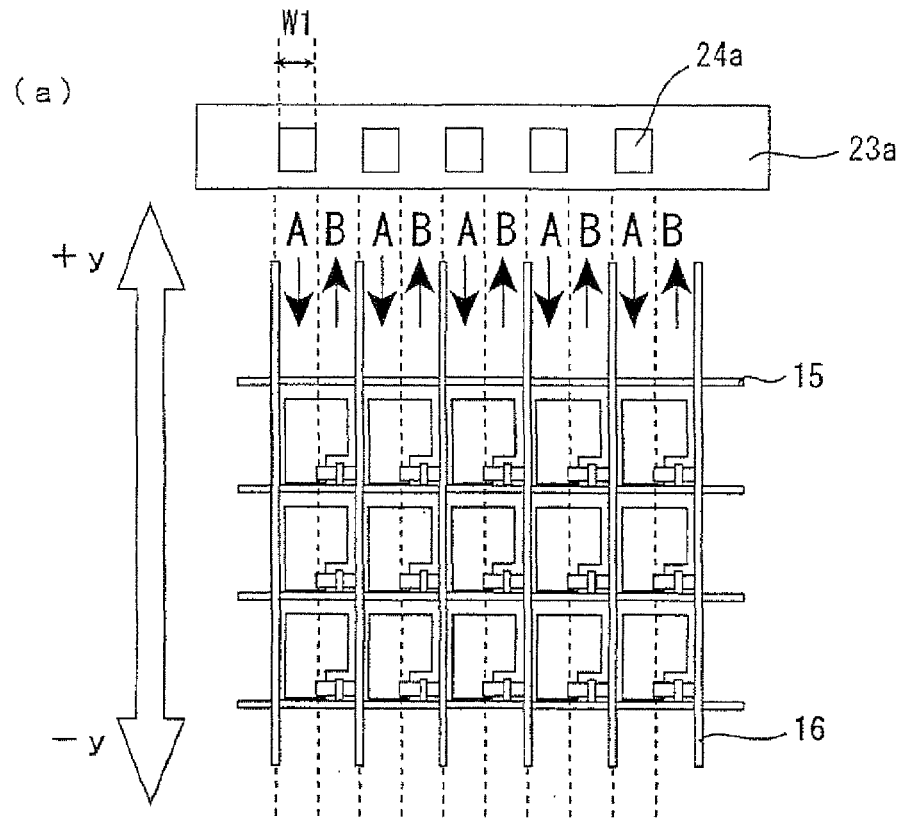
FIG. 1(a) is a plane view schematically showing a light beam emitting direction to a photo-alignment film on a TFT array substrate in Embodiment 1.
FIG. 1(b) is a plane view schematically showing a light beam emitting direction to a photo-alignment film on a CF substrate in Embodiment 1.
Figure 1:
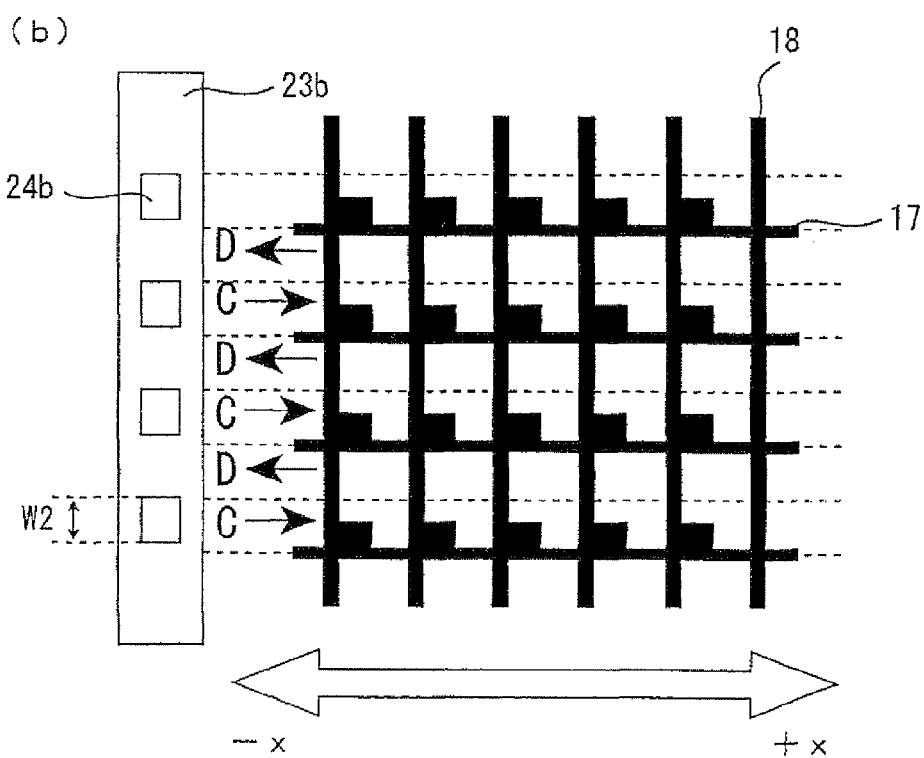

11: TFT
12: Pixel electrode
13: Black matrix (BM)
14: Color filter
15: Scanning signal line
16: Data signal line
17: BM above scanning line
18: BM above data line
20a, 20b: Exposure device
21: Stage
22: Light source
23, 23a, 23b: Photomask
24a, 24b: Opening
25: Camera for image detection
26: Substrate
31: First alignment film
32: Second alignment film
31a: Alignment direction of the first alignment film 31
32b: Alignment direction of the second alignment film 32
33: Liquid crystal molecule
34: Pretilt angle
35: Absorption axis of first polarizer
36: Absorption axis of second polarizer
A, B, C, D: Region
W1, W2: Width of opening
+x, −x, +y, −y: Scanning direction

DETAILED DESCRIPTION OF THE INVENTION

The present invention will, hereinafter, be described in more detail.

In the production method of the liquid crystal display device according to the present invention, the first alignment film and/or the second alignment film is/are subjected to scanning exposure continuously over a plurality of pixel regions. The first alignment film and/or the second alignment film are/is provided with alignment treatment (the alignment directions are defined) by the scanning exposure. More specifically, the first alignment film and/or the second alignment film are/is generally photo-alignment film(s) made of a material, in which the alignment regulating force varies by photoirradiation and the alignment direction varies depending on a photoirradiation direction or a moving direction of a photo-irradiated region. The "alignment direction" means a direction shown by projecting a tilt direction of the liquid crystal molecule in the liquid crystal layer on to the substrate surface.

In the present invention, the scanning exposure is not especially limited as long as the exposure is performed while moving a position to be irradiated with a light beam on the substrate surface. Specific embodiments of the scanning exposure include: an embodiment, in which the substrate surface is irradiated with a light beam emitted from a light source while moving the light source; an embodiment, in which the substrate surface is irradiated with a light beam emitted from a light source while moving the substrate; and an embodiment, in which the substrate surface is irradiated with a light beam emitted from a light source while moving the light source and the substrate. The scanning exposure can effectively suppress variation in characteristics of the alignment film, such as alignment direction and pretilt angle, because it is excellent in stability, such as stability in irradiance level in the substrate plane, as compared with the simultaneous exposure. In addition, the scanning exposure uses a light source smaller than that in the simultaneous exposure and the like, and thereby the exposure device can be smaller.

It is preferable that the above-mentioned scanning exposure controls the scanning direction while scanning a pattern on the substrate with a camera for image detection, and the like. Thereby, high-accuracy scanning exposure can be performed along a pixel array, even if the substrate is distorted. The pattern on the substrate, which is used for the scanning, is not especially limited, but the pattern is preferably provided periodically or continuously along the scanning direction. A wiring, a black matrix and the like formed on the substrate can be used.

In the present invention, the scanning exposure comprises exposing the first alignment film and/or the second alignment film while scanning an inside of each pixel region more than one time (scanning to and from the inside of each pixel region at least one time) in antiparallel directions to form, in the each pixel region, regions for aligning liquid crystal molecules to the surface(s) of the first alignment film and/or the second alignment film in antiparallel directions. The region exposed at the first exposure inside the pixel region and the region exposed at the second exposure inside the pixel region may overlap, but they are preferably substantially different. In the present description, "scanning in antiparallel directions" means that the movement directions in the scanning are opposed to each other, and the courses in the scanning are parallel to each other. And "to form, in the each pixel region, regions for aligning liquid crystal molecules to the surface(s) of the first alignment film and/or the second alignment film in antiparallel directions" means that a region P which aligns liquid crystal molecules near the first alignment film and/or the second alignment film in a direction and a region Q which aligns the liquid crystal molecules near the first alignment film and/or the second alignment films in a direction antiparallel to the alignment direction in the region P are formed in an inside of each pixel region. Therefore, the alignment direction in the region P and the alignment direction in the region Q are out of alignment by substantially 180 degrees. The alignment directions in the regions P and Q need not be strictly out of alignment by 180 degrees, and may be substantially opposed. As described above, the scanning exposure is performed for the alignment film by scanning the pixel region in the direction A and the direction B that is the reverse direction of the direction A and parallel to the direction A, whereby to easily perform alignment treatment of the liquid crystal display device having two or more domains in one pixel. In the present invention, the scanning exposure is continuously performed over a plurality of pixel regions. Therefore, the alignment patterns antiparallel to each other continue over a plurality of pixel regions subjected to the scanning exposure, in the alignment film of the liquid crystal display device produced by the production method of the present invention. Therefore, the present invention is most preferably applied as a production method of liquid crystal display devices in VATN mode and the like.

Examples of embodiments of the above-mentioned scanning exposure include: an embodiment, in which a spot light beam is emitted with a spot light source; an embodiment, in which a line light beam is emitted along a scanning direction of the scanning exposure with a line light source; and an embodiment, in which exposure is performed through a photomask with various light sources. In these embodiments, one pixel region can be provided with an irradiated region and a non-irradiated region, which allows for domain division in which the alignment directions are antiparallel. Among these embodiments, the embodiment of performing exposure through a photomask can easily control the shape of the light beam by providing the photomask with desired openings, regardless of the shape of the light source. The present invention adopts the scanning exposure. Therefore, even if an alignment film formed on a large substrate is subjected to the alignment treatment, no large photomask is needed and therefore problems such as reduction in exposure uniformity caused by distortion of the photomask do not occur.

The "spot light beam" means a light beam having a spot shape on the irradiated substrate surface. For example, a laser light beam, a light beam in which light from the light source is condensed with an optical lens so as to have a spot shape, and the like, may be used. The "line light beam" means a light beam having a substantially linear shape (strip-shaped) on the irradiated substrate surface. For example, a light beam in which light from the light source is condensed with an optical lens so as to have a substantially linear shape, and the like, may be used.

In the above-mentioned scanning exposure, the light beam is preferably made incident from an oblique direction to the normal line on the substrate surface, although depending on the material of the alignment film to be exposed. The incident angle of the light beam to the normal line on the substrate surface is preferably 5 degrees or more and 70 degrees or less in VAIN mode. This configuration can provide the liquid crystal layer with a pretilt angle suitable in VATN mode. If the incident angle is less than 5 degrees, the pretilt angle is too small, resulting in significant decrease in response speed of the liquid crystal display device. If the incident angle is more than 70 degrees, the pretilt angle is too large, and thereby a contrast ratio of the liquid crystal display device may be insufficient. However, the light beam does not need to have an incident angle, and the incident angle may be 0 degree, if appearance of the pretilt angle depends on the moving direction of the photo-irradiated region, as in the photo-alignment method disclosed in "Photo-Rubbing Method: A Single-Exposure Method to Stable Liquid-Crystal Pretilt Angle on Photo-Alignment Film", M. Kimura, three et al, IDW'04: proceedings of the 11th International Display Workshops, IDW'04 Publication committee, 2004, and LCT2-1, p. 35-38.

Various conditions in the scanning exposure, such as kind of light source, light exposure, size of light beam on the alignment film surface, scanning speed, and existence of polarizer, may be appropriately determined depending on conditions for forming the alignment film, such as desired alignment direction and pretilt angle. The "pretilt angle" means an angle formed by the alignment film surface and the longitudinal direction of the liquid crystal molecule near the alignment film when no voltage is applied to the liquid crystal layer (at OFF-state).

In the production method of the liquid crystal display device according to the present invention, processes other than the above-mentioned scanning exposure process are not especially limited as long as the production method of the present invention essentially includes the above-mentioned scanning exposure process.

The liquid crystal display device produced by the production method of the present invention, comprises a first substrate, a second substrate facing the above-mentioned first substrate, a liquid crystal layer provided between the above-mentioned substrates, a first alignment film provided on the liquid crystal layer side surface of the above-mentioned first substrate, and a second alignment film provided on the liquid crystal layer side surface of the above-mentioned second substrate. In the configuration of the liquid crystal display device produced by the present invention, components are not especially limited as long as the liquid crystal display device essentially comprises standard components of matrix-type liquid crystal display devices.

It is preferable that one substrate of the above-mentioned first and second substrates is a thin film transistor (hereinafter, also referred to as "TFT") array substrate having a TFT serving as a switching element and a pixel electrode arranged in a matrix shape. It is also preferable that the other substrate of the above-mentioned first and second substrates is a color filter substrate (hereinafter, also referred to as "CF substrate") having a color filter and a common electrode. As mentioned above, the liquid crystal display device produced by the production method of the present invention is preferably an active matrix-type liquid crystal display device, but may be a simple matrix-type liquid crystal display device. If a simple matrix-type liquid crystal display device is produced by the production method of the present invention, as the first substrate and the second substrate, a combination of a substrate provided with stripe-shaped signal electrodes (column electrodes) and a substrate provided with stripe-shaped scanning electrodes (row electrodes) arranged so as to be substantially perpendicular to the scanning electrodes may be mentioned.

A pixel is specified by the pixel electrode and the common electrode facing the pixel electrodes in the active matrix-type liquid crystal display device. In the simple matrix-type liquid crystal display device, a pixel is specified by the intersection of the strip-shaped signal electrode and the scanning electrode.

The liquid crystal mode in the above-mentioned liquid crystal layer is not especially limited, but Vertical Alignment (VA) mode in which domain division is provided is preferable. That is, it is preferable that the above-mentioned liquid crystal layer contains liquid crystal molecules with negative dielectric anisotropy, and the above-mentioned first alignment film and the above-mentioned second alignment film align the liquid crystal molecules substantially vertically the surfaces of the first alignment film and the second alignment film. The present invention utilizes the scanning exposure, and therefore is suitable for liquid crystal display devices in liquid crystal modes, such as VA mode in which domain division is provided, in which the alignment film need to control the pretilt angle of the liquid crystal molecules with high accuracy.

As the above-mentioned VA mode in which domain division is provided, VATN mode, VAECB mode, VAHAN mode and the like may be mentioned. Among them, VATN mode is most preferably used. That is, it is preferable in the production method of the liquid crystal display device of the present invention that the exposure and attachment of the first substrate and the second substrate are performed such that a direction of the scanning exposure for the first alignment film and a direction of the scanning exposure for the second alignment film are substantially perpendicular to each other. In VATN mode, both of the first alignment film and the second alignment film have alignment patterns antiparallel to each other, which continue over a plurality of pixel regions. Therefore, use of the alignment treatment method according to the present invention permits easily formation of four domains inside the pixel region, whereby to provide an excellent viewing angle characteristic. In addition, it is especially important to perform the alignment treatment of the alignment film stably, because, in VATN mode, the pretilt angle of the liquid crystal molecules has a large influence on display characteristics of the liquid crystal display.

In the present description, "the exposure and attachment of the first substrate and the second substrate are performed such that a direction of the scanning exposure for the first alignment film and a direction of the scanning exposure for the second alignment film are substantially perpendicular to each other" means that the alignment direction of the liquid crystal molecules near the first alignment film and the alignment direction of the liquid crystal molecules near the second alignment film are not necessarily perpendicular to each other completely as long as the alignment directions are substantially perpendicular to each other to provide liquid crystal display in VAIN mode. More specifically, the alignment direction of the first alignment film and the alignment direction of the second alignment film preferably cross at 85 to 95 degrees.

In the production method of the liquid crystal display device according to the present invention, the exposure and the attachment of the substrates are performed such that the direction of the scanning exposure in the first alignment film and the direction of the scanning exposure in the second alignment film facing the first alignment film are substantially parallel to each other to produce a liquid crystal display device in VAECB mode. In VAECB mode, however, the production method according to the present invention can only produce a liquid crystal display device having up to two domains in one pixel.

As the exposure device for alignment treatment used in the present invention, preferred is an exposure device for alignment treatment comprising: a stage; a light source for emitting a light beam at an incident angle of 0 degree or more and less than 90 degrees to the normal line on the stage surface; and means for moving the stage and/or the light source in antiparallel directions. The present invention include such an exposure device for alignment treatment comprising a stage and a light source, wherein the light source emits a light beam at an incident angle of 0 degree or more and less than 90 degrees to the normal line on the stage surface, and the exposure device for alignment treatment further comprises means for moving the stage and/or the light source in antiparallel directions. Such an exposure device for alignment treatment according to the present invention provides photo-alignment treatment by the scanning exposure, and therefore the photo-alignment treatment can be performed more efficiently and stably as compared with the photo-alignment treatment by the simultaneous exposure. Therefore, the exposure device for alignment treatment is most preferably used for the alignment treatment of the liquid crystal display devices in VATN mode and the like.

The above-mentioned stage is not especially limited as long as thereon the first substrate and/or the second substrate can be placed. A stage capable of fixing the substrate by vacuum adsorption, and the like is preferred. With respect to the light irradiation form of the above-mentioned light source, a plurality of light sources is preferably disposed at regular distances if the exposure is performed without a photomask. If the exposure is performed through a photomask, the arrangement form of the above-mentioned light source is not especially limited. It is preferable that the light beam emitted to the above-mentioned stage is converted into polarized light using a polarizer and the like. The above-mentioned exposure device for alignment treatment preferably includes a camera for image detection and an image processing device, which makes it possible to control the scanning direction while scanning the pattern on the substrate.

In the production method of the liquid crystal display device according to the present invention, the scanning exposure is performed while scanning each pixel region more than one time in antiparallel directions, and therefore, the alignment treatment can be provided efficiently and stably for the alignment film of the liquid crystal display device, in which a plurality of domains are formed inside the pixel region. Such production method of the liquid crystal display device according to the present invention is suitably applied to production of the liquid crystal display devices in VATN mode.

BEST MODE FOR CARRYING OUT THE INVENTION

The present invention will, hereinafter, be described in more detail with reference to Embodiments, but the present invention is not limited to these Embodiments.

Embodiment 1

Figure 2:
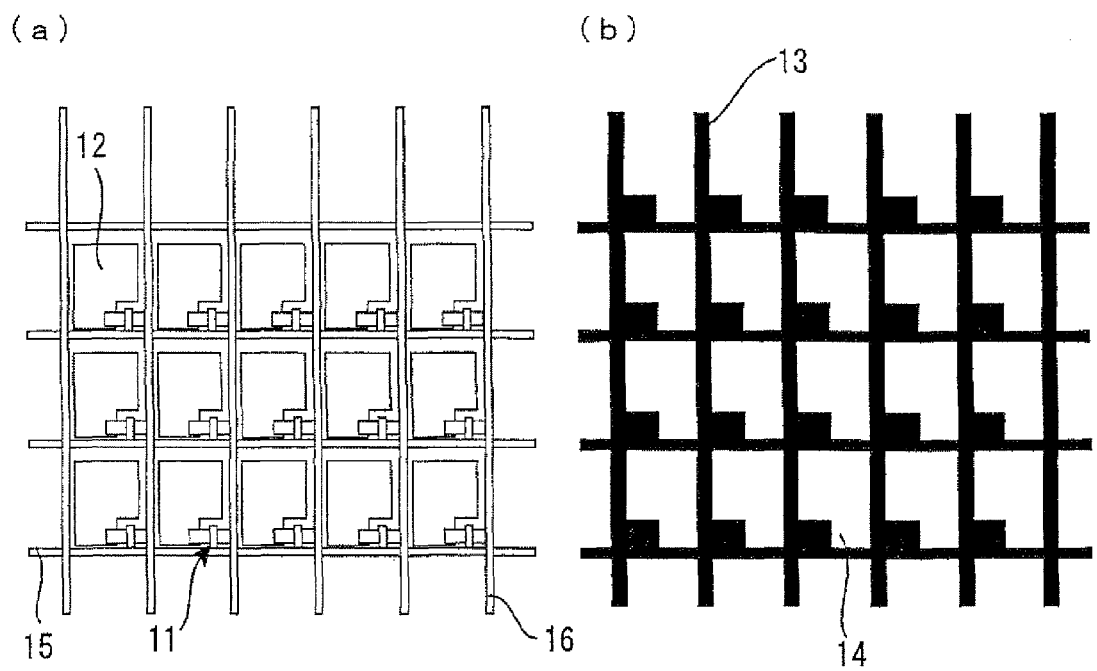
FIG. 2(a) is a plane view schematically showing the TFT array substrate that is a first substrate in Embodiment 1.
FIG. 2(b) is a plane view schematically showing the CF substrate that is a second substrate in Embodiment 1.
Figure 3:
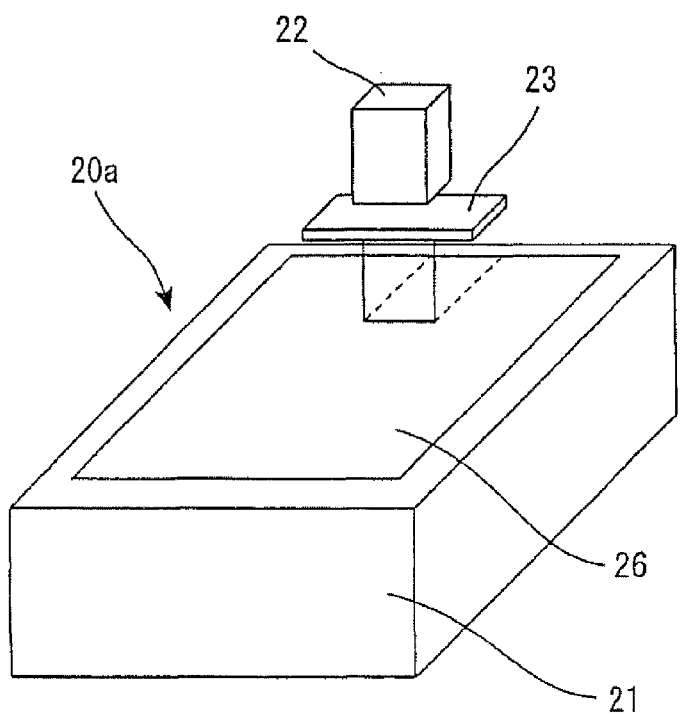
FIG. 3 is a perspective view schematically showing an exposure device in Embodiment 1.

A production method of a liquid crystal display panel in 4VATN mode in Embodiment 1 according to the present invention is mentioned below with reference to FIGS. 1(a) to 3. FIG. 1(a) is a plane view schematically showing a light beam emitting direction to a photo-alignment film on a TFT array substrate in Embodiment 1. FIG. 1(b) is a plane view schematically showing a light beam emitting direction to a photo-alignment film on a CF substrate in Embodiment 1. FIG. 2(a) is a plane view schematically showing the TFT array substrate as the first substrate in Embodiment 1. FIG. 2(b) is a plane view schematically showing the CF substrate as the second substrate in Embodiment 1. FIG. 3 is a perspective view schematically showing an exposure device in Embodiment 1.

First, a pair of the first substrate and the second substrate each having no alignment film is prepared by a usual method. As the first substrate, a TFT array substrate shown in FIG. 2(a), which is prepared as follows, is used. (1) the scanning signal line 15, (2) the TFT 11, (3) the pixel electrode 12 and (4) the data signal line 16 are successively formed on a glass substrate (not shown) to dispose the scanning signal line 12 and the data signal line 16 in a matrix shape on the substrate with an insulating film (not shown) therebetween, and the TFT 11 and the pixel electrode 12 are disposed at an intersection of the scanning signal line 15 and the data signal line 16. As the second substrate, a CF substrate shown in FIG. 2(b), which is prepared as follows, is used. (1) the Black Matrix (BM) 13, (2) the color filter 14, (3) the protective film (not shown) and (4) the transparent electrode film (not shown) are successively formed on a glass substrate (not shown) to dispose the BM 13 on the substrate in a matrix shape, and the color filter 14 is disposed at a region partitioned by the BM 13. The substrate is not especially limited to a glass substrate as long as it has an insulating surface. Materials usually used may be used as materials for the above-mentioned components.

Then, a solution containing a photo-alignment film material is applied to the TFT array substrate and the CF substrate by spin cast method and the like, and calcined at 180° C. for 60 minutes to form a vertical photo-alignment film on both substrates. The photo-alignment film material is not especially limited, and a resin containing a photosensitive group, and the like may be mentioned. Specific preferred examples of such a resin include polyimide containing a photosensitive group such as 4-chalcone group (the following chemical formula (1)), 4'-chalcone group (the following chemical formula (2)), coumarin group (the following chemical formula (3)), and cinnamoyl group (the following chemical formula (4)). The above-mentioned photosensitive groups (1) to (4) generate crosslinking reaction (including dimerization reaction), isomerization, photo-realignment, and the like, by light beam irradiation. Use of the photo-alignment film material containing the photosensitive group can more effectively reduce variation in the pretilt angle as compared with use of decomposition photo-alignment film materials. The photosensitive groups in the following formulae (1) to (4) may have a structure in which a substituent group is bonded to the benzene ring. A cinnamate group ($C_6H_5$—CH=CH—COO—), in which an oxygen atom is further bonded to the carbonyl group in the cinnamoyl group represented by the formula (4), has an advantage of easy synthesis. Accordingly, polyimide containing a cinnamate group is more preferable as the photo-alignment film material. The calcination temperature, calcination time and thickness of the photo-alignment film are not especially limited and may be appropriately determined.

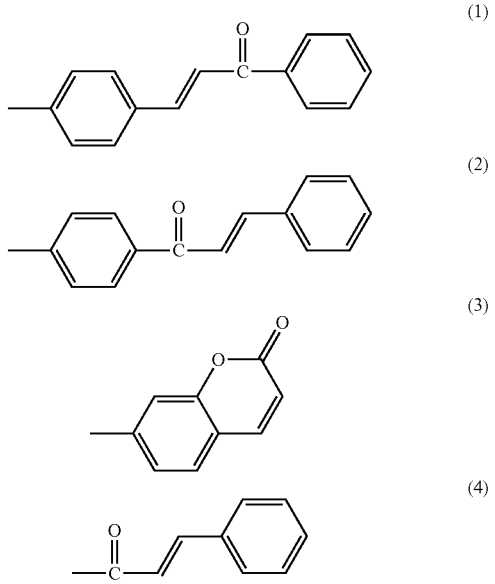

Then, a method of scanning exposure for the TFT array substrate is explained. First, an exposure device is explained with reference to FIG. 3. The exposure device 20a in Embodiment 1 includes, as shown in FIG. 3, the stage 21 for placing the substrate 26 thereon, the light source 22 having a lamp, a polarizer, and an optical filter, and the photomask 23 mounted below the light source and in a light beam emitting direction. The stage 21, and/or the light source 22 and the photomask 23 are designed to be capable of moving relatively horizontally. Such a configuration enables the exposure device 20a to perform scanning exposure for the photo-alignment film formed on the substrate surface by a light beam emitted through openings (not shown) formed in the photomask 23. The light source 22 is designed to be capable of being inclined toward the oblique direction to the stage 21 and the photomask 23. As a result, the exposure device 20a can perform scanning while irradiating the photo-alignment film formed on the substrate surface with light from an appropriate oblique direction. The lamp is not especially limited, and may be a low-pressure mercury lamp, a deuterium lamp, a metal halide lamp, an argon resonance lamp, a xenon lamp, and the like. Laser, such as excimer laser, may be used instead of the lamp. The wavelength of the emitted light may be appropriately determined depending on the alignment film material and the like, and ultraviolet radiation is preferably used. The extinction ratio of the polarizer, the kind of the optical filter, the proximity gap that is a distance between the substrate and the photomask, and the like, may be appropriately determined.

Then, a method of exposing the TFT array substrate is explained with reference to FIG. 1(a). First, the TFT array substrate is placed on the stage of the exposure device. As shown in FIG. 1(a), a plurality of openings 24a was formed inside the photomask 23a. This opening 24a has a rectangular planar shape and has a width W1 which is substantially half the pixel pitch in the scanning signal line 15 direction (horizontal direction in FIG. 1(a)). The pitch of the plurality of openings 24a is designed to have the same length as that of the pixel pitch in the scanning signal line 15 direction. Then, the end of the opening 24a of the photomask 23a is positioned along the data signal line 16. The scanning exposure is performed along the data signal line 16 in the scanning direction −y (downward direction in FIG. 1(a)) continuously over a plurality of pixel regions from one end of the TFT array substrate to the other. Then, the position of the opening 24a is moved horizontally by substantially half the width of the pixel pitch in the scanning signal line 15 direction to similarly position the end of the opening 24a along the data signal line 16. Then, the scanning exposure is similarly performed along the data signal line 16 in the scanning direction +y (in the direction antiparallel to the scanning direction −y, that is, upward direction in FIG. 1(a)) from one end of the TFT array substrate to the other. As a result, one pixel region of the TFT array substrate is divided into two regions: region A and region B, where the alignment directions are antiparallel. The scanning exposure is dramatically excellent in stability of the irradiance level as compared with fractionated exposure and the like, and therefore can effectively suppress variation in characteristics in each region A and B, such as the alignment direction, and the pretilt angle. The planar shape of the opening 24a is not especially limited as long as a desired domain pattern can be formed. Besides the planar shape, circular, ellipse, substantially linear shape (strip-shaped) and the like may be mentioned. The width W1 of the opening 24a may be appropriately determined depending on a desired domain pattern, and it is preferably determined such that a non-irradiated region is not formed after the scanning exposure.

Then, a method of exposing the CF substrate is explained with reference to FIG. 1(b). First, the CF substrate is placed on the stage of the exposure device. As shown in FIG. 1(b), a plurality of openings 24b are formed inside the photomask 23b formed. The opening 24b has a rectangular planar shape and has a width W2 which is substantially half the pixel pitch in the direction (upward and downward direction in FIG. 1(b)) of the BM 18 formed at the position corresponding to the data signal line of the TFT array substrate (hereinafter, also referred to as "BM above data line"). The pitch of the plurality of openings 24b is designed to have the same length as that of the pixel pitch in the BM above data line 18 direction. Then, the end of the opening 24b of the photomask 23b is positioned along the BM 17 formed at the position corresponding to the scanning signal line of the TFT array substrate (hereinafter, also referred to as "BM above scanning line"). The scanning exposure is performed along the BM above scanning line 17 in the scanning direction +x (rightward direction in FIG. 1(b)) continuously over a plurality of pixel regions from one end of the CF substrate to the other. Then, the position of the opening 24b is moved horizontally by substantially half the width of the pixel pitch in the BM above data line 18 direction to similarly position the end of the opening 24b to the BM above scanning line 17. Then, the scanning exposure is similarly performed from one end of the CF substrate to the other along the BM above scanning line 17 in the scanning direction −x (in the direction antiparallel to the scanning direction +x, that is, leftward direction in FIG. 1(b)). As a result, one pixel region of the CF substrate is divided into two regions: region C and region D, where the alignment directions are antiparallel. The scanning exposure can effectively suppress variation in the characteristics in each region C and D, as in the scanning exposure provided for the TFT array substrate. The planar shape of the opening 24b is not especially limited as long as a desired domain pattern can be formed. Besides the planar shape, circular, ellipse, substantially linear shape (strip-shaped) and the like may be mentioned. The width W2 of the opening 24b may be appropriately determined depending on a desired domain pattern, and it is preferably determined such that a non-irradiated region is not formed after the scanning exposure.

Embodiment 1 describes the method of the scanning exposure using the photomask, but the photomask may not be used. In this case, it is preferable that the light beam shape on the alignment film surface is appropriately adjusted with an optical lens and the like. It is preferable that an incident angle of the emitted light beam to the normal line on the substrate surface is 5 or more degrees and 70 or less degrees in order to provide the liquid crystal molecule with a pretilt angle suitable in 4VATN mode, although depending on the material for the alignment film to be exposed. It is also preferable that the irradiance level and the scanning speed at the scanning exposure are appropriately determined. However, a light beam does not need to have an incident angle, and the incident angle may be 0 degree, if appearance of the pretilt angle depends on the moving direction of the photo-irradiated region, as in the photo-alignment method disclosed in "Photo-Rubbing Method: A Single-Exposure Method to Stable Liquid-Crystal Pretilt Angle on Photo-Alignment Film", M. Kimura, three et al, IDW'04: proceedings of the 11th International Display Workshops, IDW'04 Publication committee, 2004, and LCT2-1, p. 35-38. In 4VATN mode, the scanning direction on the TFT array substrate and that on the CF substrate are not especially limited to those shown in FIGS. 1(a) and 1(b) as long as the scanning directions on the substrates are substantially perpendicular to each other when the substrates are attached to each other.

Figure 7:
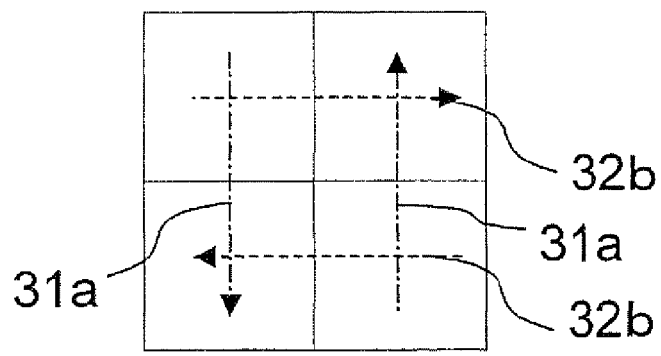
FIG. 7 is a conceptual view showing relationships of four domains and alignment directions of alignment films in one pixel of a liquid crystal display device in 4VATN mode.
Figure 8:
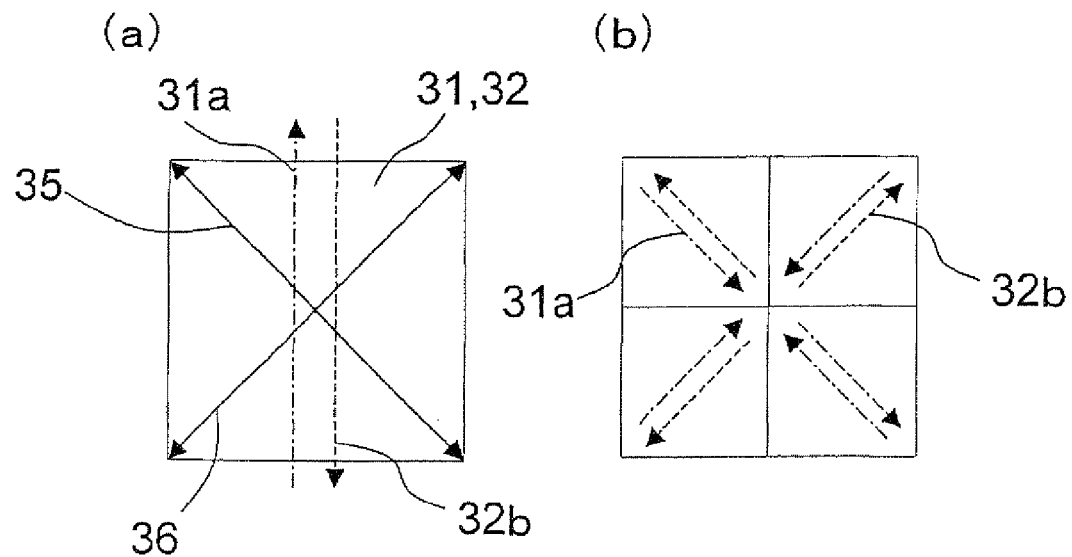
FIG. 8(a) is a conceptual view showing relationships of alignment directions of alignment films and directions of absorption axes of polarizers in one domain of a liquid crystal display device in VAECB mode.
FIG. 8(b) is a conceptual view showing relationships of four domains and alignment directions of alignment films in one pixel of a liquid crystal display device in 4VAECB mode.

Then, plastic beads in 4 μm, for example, are spread over the TFT array substrate or the CF substrate subjected to the scanning exposure, and then the substrates are attached to each other. The relationship of the light beam emitting directions in one pixel region of the both substrates is as shown in FIG. 7. In each domain, the scanning directions of the substrates facing each other are substantially perpendicular to each other.

Then, if a nematic liquid crystal material with negative dielectric anisotropy is injected between the substrates, the liquid crystal molecules appear pretilt angles in directions different from one domain to another. As a result, in each domain, the alignment direction of the liquid crystal molecules near the center in the in-plane direction and the thickness direction of the liquid crystal layer is inclined at 45 degrees from the light beam emitting direction. Therefore, the liquid crystal molecules in four domains incline in four different directions respectively when a signal voltage is applied to the produced liquid crystal display panel. As a result, a wide viewing angle can be provided. The pretilt angle is not especially limited, but it is preferably 85 degrees or more and less than 90 degrees in 4VATN mode in terms of increase in transmittance of the liquid crystal display panel. It is also preferable that the variation in the pretilt angle is within 0.5 degrees in 4VATN.

Then, two polarizers are attached to each outside of the substrates such that each other's absorption axes are perpendicular and one of the absorption axes is parallel to the bus line (the scanning signal line or the data signal line) of the TFT array substrate. Thereby, the liquid crystal molecules align substantially vertically at OFF-state, and therefore the liquid crystal display panel can provide excellent black display (normally black mode). The liquid crystal display panel has four domains for aligning the liquid crystal molecules in four different directions, respectively, and therefore exhibits display characteristics hardly depending on a viewing angle direction. As mentioned above, the production method of the liquid crystal display panel in Embodiment 1 adopts the scanning exposure. Therefore, a liquid crystal panel in 4VATN mode having domains with small variation in the characteristics can be produced with a small number of alignment treatments.

Embodiment 2

Figure 4:
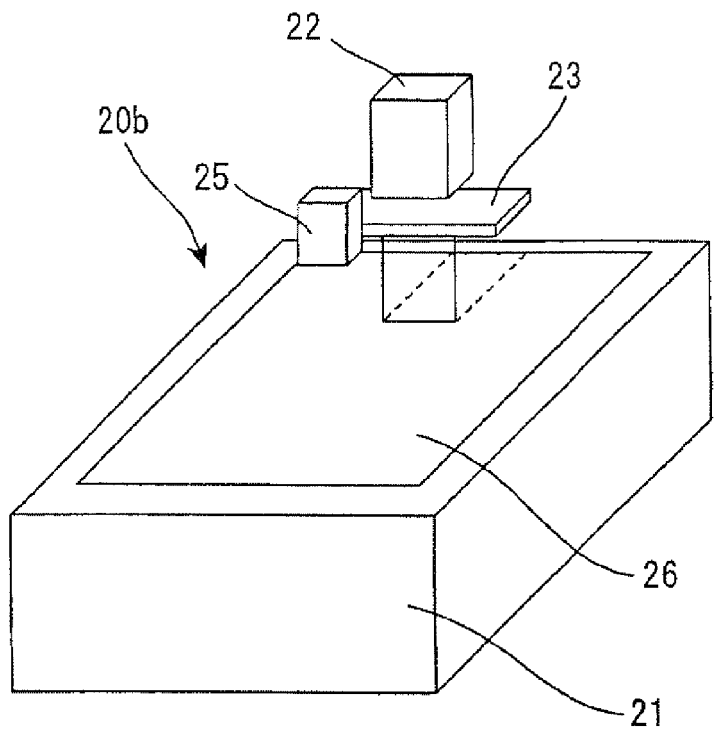
FIG. 4 is a perspective view schematically showing an exposure device in Embodiment 2.
Figure 5:
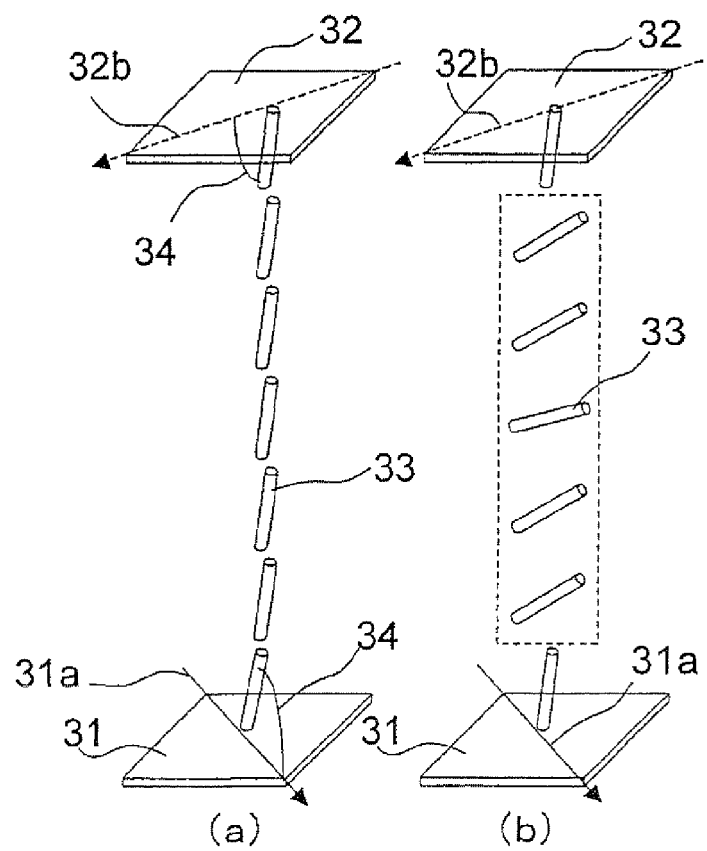
FIGS. 5(a) and 5(b) are conceptual views explaining drive principle of a liquid crystal display device in VATN mode.
Figure 6:
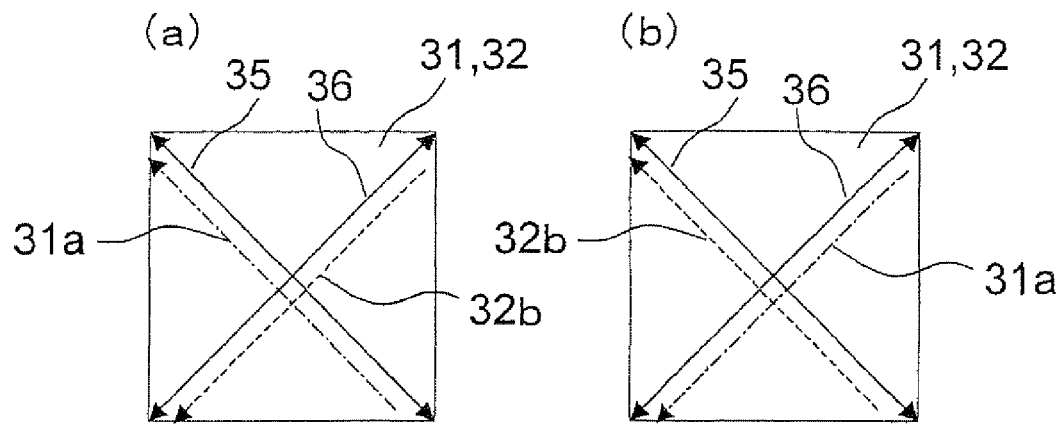
FIGS. 6(a) and 6(b) each show one embodiment of the positional relationships.

A production method of a liquid crystal display panel in 4VATN mode in Embodiment 2 according to the present invention is mentioned below with reference to FIG. 4. FIG. 4 is a perspective view schematically showing an exposure device in Embodiment 2. The liquid crystal display panel in 4VATN mode in Embodiment 2 is produced in the same manner as in Embodiment 1, except for the configuration of the exposure device and the embodiment of the scanning exposure. Therefore, overlapping contents between Embodiment 1 and Embodiment 2 are omitted.

First, the exposure device in Embodiment 2 is explained with reference to FIG. 4. As shown in FIG. 4, the exposure device 20b in Embodiment 2 has a configuration in which the exposure device 20a in Embodiment 1 further comprises the camera for image detection 25 for detecting a linear micropattern, such as the bus line (the scanning signal line or the data signal line) and the BM formed on the substrate. According to such a configuration, the exposure device 20b in Embodiment 2 analyzes and processes images taken by the camera for image detection 25, whereby to identify positions of the stage 21, and/or the photomask 23 and the light source 22 based on the taken images.

Then, a method of the scanning exposure in Embodiment 2 is explained. First, the substrate 26, which is an object to be exposed, is placed on the stage 21. Then, the stage 21, and/or the photomask 23, and light source 22 are automatically moved horizontally to an exposure starting position, based on position data obtained by analysis and processes of images of the BM, the bus line and the like, formed on the substrate, the images being taken by the camera for image detection 25, and thereby to set an opening (not shown) of the photomask 23 to a predetermined position. Similarly during the light beam irradiation treatment, images taken by the camera for image detection 25 are analyzed and processed and then the scanning exposure is performed while correcting the positions of the stage 21, and/or the photomask 23 and the light source 22 point by point such that the position of the openings is not out of alignment with the bus line, the BM, and the like. As mentioned above, the production method of the liquid crystal display panel in Embodiment 2 uses the camera for image detection 25 to identify the exposure starting position and correct the exposure position. Therefore, desired domains can be formed inside the pixel region with high accuracy even if the TFT array substrate or the CF substrate has a distorted pixel array.

The present application claims priority under the Paris Convention and the domestic law in the country to be entered into national phase on Patent Application No. 2005-350020 filed in Japan on Dec. 2, 2005, the entire contents of which are hereby incorporated by reference.

The terms "or more" and "or less" in the present description that the value described is included.

The invention claimed is:

1. A production method of a liquid crystal display device comprising a first substrate; a second substrate facing to the first substrate; a liquid crystal layer provided between the first and the second substrates; a first alignment film provided on the liquid crystal layer side surface of the first substrate; and a second alignment film provided on the liquid crystal layer side surface of the second substrate, at least one of the first alignment film and the second alignment film being a photo-alignment film providing liquid crystal molecules with pretilt angles in response to photo irradiation, the method comprising:

a step of scanning exposure, the scanning exposure being defined by exposing the first alignment film and/or the second alignment film while scanning a spot of a light beam linearly continuously over a plurality of pixels on the surface of the first substrate and/or the second substrate, wherein the scanning exposure scans an inside of each pixel more than one time along a first direction and a second direction parallel and reverse to the first direction, whereby the scanning exposure forms a plurality of regions dividing alignment of the liquid crystal molecules in the inside of the each pixel, the liquid crystal molecules aligning parallel and reverse to each other in the plurality of region.

2. The production method according to claim 1, wherein the liquid crystal layer contains liquid crystal molecules with negative dielectric anisotropy, and the first alignment film and the second alignment film align the liquid crystal molecules substantially vertically to the surfaces of the first alignment film and the second alignment film.

3. The production method according to claim 2, wherein attachment of the first substrate and the second substrate is performed such that a direction of the scanning exposure for the first alignment film and a direction of the scanning exposure for the second alignment film are substantially perpendicular to each other.

4. The production method according to claim 1, wherein the scanning exposure is performed through a photomask between a light source and the first alignment film and/or the second alignment film.

5. The production method according to claim 4, wherein the photomask is provided with openings having substantially linear shape.

6. The production method according to claim 5, wherein a pitch between the openings has the same length as that of a pitch of the plurality of pixel in a direction perpendicular to a direction of the scanning exposure.

7. The production method according to claim 1, wherein the scanning exposure is continuously performed from one end of the first substrate and/or the second substrate to the other end of the first substrate and/or the second substrate, and then continuously performed from the other end to the one end.

8. The production method according to claim 1, wherein an incident angle of the light beam to a normal line on the substrate surface is 5 or more degrees and 70 or less degrees.

9. The production method according to claim 1, wherein the light beam is polarized light.

10. The production method according to claim 1, wherein the light beam is ultraviolet light.

11. The production method according to claim 1, wherein the pretilt angles of liquid crystal molecules are 85 or more degrees and less than 90 degrees.

12. The production method according to claim 1, wherein a variation in the pretilt angles of liquid crystal molecules is within 0.5 degrees.

13. The production method according to claim 1, wherein a width of the plurality of region dividing alignment is substantially half pitch of the plurality of pixel in a direction perpendicular to a direction of the scanning exposure.

14. The production method according to claim 13, wherein area ratios of each region dividing alignment in the each pixel are equal to each other.

15. The production method according to claim 1, wherein the liquid crystal display device includes a first polarizer on the first substrate side and a second polarizer on the second substrate side, an alignment direction of the first alignment film is parallel to an absorption axis of the first polarizer, and an alignment direction of the second alignment film is parallel to an absorption axis of the second polarizer.

16. The production method according to claim 1, wherein the scanning exposure is performed while correcting the spot of the light beam based on data of the position detected by a camera.

17. A liquid crystal display device of VATN mode produced by using the production on method of the liquid crystal display device according to claim 1.

* * * * *